United States Patent
Chen et al.

(10) Patent No.: US 12,360,690 B2
(45) Date of Patent: Jul. 15, 2025

(54) METHOD AND APPARATUS FOR CONTROLLING INTERNAL MEMORY BANDWIDTH, PROCESSOR, AND COMPUTING DEVICE

(71) Applicant: Huawei Technologies Co., Ltd., Shenzhen (CN)

(72) Inventors: Huan Chen, Chengdu (CN); Xiaoping Zhu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/612,459

(22) Filed: Mar. 21, 2024

(65) Prior Publication Data

US 2024/0231654 A1    Jul. 11, 2024

Related U.S. Application Data (63) Continuation of application No. PCT/CN2022/120293, filed on Sep. 21, 2022.

(30) Foreign Application Priority Data

Sep. 30, 2021  (CN) .......................... 202111166082.3

(51) Int. Cl.
    *G06F 3/06*    (2006.01)
(52) U.S. Cl.
    CPC .......... *G06F 3/0631* (2013.01); *G06F 3/0604* (2013.01); *G06F 3/0683* (2013.01)
(58) Field of Classification Search
    CPC .... G06F 3/0631; G06F 3/0604; G06F 3/0683; G06F 12/02; G06F 12/0238; G06F 12/126; G06F 12/08; G06F 12/0284; G06F 12/0811; G06F 2212/1024; G06F 2212/1044; G06F 2212/205; G06F 2212/502; G06F 2212/601
    See application file for complete search history.

(56) References Cited

U.S. PATENT DOCUMENTS

| | | | |
|---|---|---|---|
| 2005/0235285 A1* | 10/2005 | Monasterio ........... | G06F 9/4843 718/100 |
| 2011/0029735 A1* | 2/2011 | Chiang ............... | G06F 12/0866 711/E12.001 |
| 2014/0092678 A1* | 4/2014 | Feekes .................... | G06F 12/08 365/163 |

(Continued)

*Primary Examiner* — Khoa D Doan
(74) *Attorney, Agent, or Firm* — Conley Rose, P.C.

(57) ABSTRACT

A method for controlling an internal memory bandwidth includes after obtaining a bandwidth required by a to-be-accessed internal memory medium, a processor in a system obtains an occupancy rate of an internal memory bandwidth of the to-be-accessed internal memory medium. If determining, based on the occupancy rate of the internal memory bandwidth, that the to-be-accessed internal memory medium cannot satisfy a bandwidth requirement, the processor adjusts, under an indication of a bandwidth adjustment policy, the occupancy rate of the internal memory bandwidth based on a factor that affects the occupancy rate of the internal memory bandwidth of the to-be-accessed internal memory medium, and the processor uses a first bandwidth that satisfies the bandwidth requirement in an adjusted remaining bandwidth of the to-be-accessed internal memory medium.

20 Claims, 7 Drawing Sheets

(56) References Cited

U.S. PATENT DOCUMENTS

| | | | |
|---|---|---|---|
| 2014/0325248 A1* | 10/2014 | Kim | G06F 13/4234 |
| | | | 713/320 |
| 2016/0072723 A1* | 3/2016 | Shanmuganathan | ........................ |
| | | | H04L 69/163 |
| | | | 709/226 |
| 2017/0192686 A1 | 7/2017 | Niu et al. | |
| 2022/0171549 A1* | 6/2022 | Saeed | G06F 3/0604 |

* cited by examiner

METHOD AND APPARATUS FOR CONTROLLING INTERNAL MEMORY BANDWIDTH, PROCESSOR, AND COMPUTING DEVICE

CROSS-REFERENCE TO RELATED APPLICATIONS

This is a continuation of International Patent Application No. PCT/CN2022/120293 filed on Sep. 21, 2022, which claims priority to Chinese Patent Application No. 202111166082.3 filed on Sep. 30, 2021. The disclosures of the aforementioned applications are hereby incorporated by reference in their entireties.

TECHNICAL FIELD

This disclosure relates to the field of computer technologies, and in particular, to a method and an apparatus for controlling an internal memory bandwidth, a processor, and a computing device.

BACKGROUND

With development of a multi-core processor, a quantity of cores of a single processor gradually increases, and a computing speed of the processor also continuously increases. An access speed and an internal memory capacity of an internal memory severely lag behind the computing speed of the processor. Consequently, a problem of an "internal memory wall" is increasingly prominent. At present, a plurality of types of storage media are disposed in a computer system to increase an internal memory capacity. However, a larger storage capacity of the storage medium indicates a lower access speed and larger latency. This increases a storage capacity of an internal memory in the computer system, and also decreases an overall access speed of the internal memory. Therefore, how to ensure the overall access speed of accessing the internal memory by a processor while increasing the internal memory capacity is an urgent problem to be resolved.

SUMMARY

This disclosure provides a method and an apparatus for controlling an internal memory bandwidth, a processor, and a computing device, to ensure an overall access speed of accessing an internal memory by the processor while increasing an internal memory capacity.

According to a first aspect, a method for controlling an internal memory bandwidth is provided. A hybrid internal memory system includes a plurality of processors and a plurality of different types of internal memory media, a first processor is associated with at least two different types of internal memory media, the first processor is any one of the plurality of processors, and the method is performed by the first processor, and includes the following steps: after obtaining a bandwidth required by a to-be-accessed internal memory medium, the first processor obtains an occupancy rate of an internal memory bandwidth of the to-be-accessed internal memory medium. If determining, based on the occupancy rate of the internal memory bandwidth, that the to-be-accessed internal memory medium cannot satisfy a bandwidth requirement, the first processor adjusts, under an indication of a bandwidth adjustment policy, the occupancy rate of the internal memory bandwidth based on a factor that affects the occupancy rate of the internal memory bandwidth of the to-be-accessed internal memory medium, and uses a first bandwidth that satisfies the bandwidth requirement in an adjusted remaining bandwidth of the to-be-accessed internal memory medium. In this way, a remaining bandwidth of an internal memory medium is dynamically adjusted, so that the to-be-accessed internal memory medium can provide an application run by the processor with a sufficient bandwidth for use, to ensure an overall access speed of accessing an internal memory by the processor.

The factor that affects the occupancy rate of the internal memory bandwidth of the to-be-accessed internal memory medium includes at least one of a user-oriented application and a system-oriented application that are run by the first processor. For example, the user-oriented application includes a big data application, a database application, and a cloud service application. The system-oriented application includes an operating system management application, internal memory copy, and data migration.

In a possible implementation, adjusting the occupancy rate of the internal memory bandwidth according to the bandwidth adjustment policy includes: controlling the factor that affects the occupancy rate of the internal memory bandwidth of the to-be-accessed internal memory medium to occupy the bandwidth of the to-be-accessed internal memory medium, to obtain the adjusted remaining bandwidth, where the adjusted remaining bandwidth is greater than a remaining bandwidth before adjustment.

For example, the controlling the factor that affects the occupancy rate of the internal memory bandwidth of the to-be-accessed internal memory medium to occupy the bandwidth of the to-be-accessed internal memory medium includes: determining a limited available bandwidth of the to-be-accessed internal memory medium based on the remaining bandwidth and a bandwidth threshold; and controlling, based on the limited available bandwidth, the factor that affects the occupancy rate of the internal memory bandwidth of the to-be-accessed internal memory medium to access the to-be-accessed internal memory medium, to obtain the adjusted remaining bandwidth. The bandwidth threshold is obtained based on a total bandwidth of the to-be-accessed internal memory medium and an adjustment factor.

In another possible implementation, the at least two different types of internal memory media associated with the first processor include a first internal memory medium and a second internal memory medium, and an access speed of the first internal memory medium is greater than an access speed of the second internal memory medium; and the to-be-accessed internal memory medium is the first internal memory medium associated with the first processor or the second internal memory medium associated with the first processor; and/or the to-be-accessed internal memory medium is a first internal memory medium associated with a processor adjacent to the first processor or a second internal memory medium associated with the processor adjacent to the first processor.

In another possible implementation, using the first bandwidth that satisfies the bandwidth requirement in the adjusted remaining bandwidth of the to-be-accessed internal memory medium includes: accessing, based on the first bandwidth, internal memory space allocated at a preset internal memory allocation granularity in the to-be-accessed internal memory medium, where the preset internal memory allocation granularity is greater than a page size of the internal memory medium.

In another possible implementation, the first processor is connected to the plurality of different types of internal memory media through an interface that supports internal memory semantics, and the interface includes at least one interface that supports a Compute Express Link (CXL), Cache Coherent Interconnect for Accelerators (CCIX), or a Unified Bus (UB or U bus).

In another possible implementation, the first internal memory medium is a dynamic random-access memory (DRAM), the second internal memory medium is a storage-class memory (SCM), and the SCM includes at least one of a phase-change memory (PCM), a magnetoresistive random-access memory (MRAM), a resistive random-access memory (RRAM/ReRAM), a ferroelectric random-access memory (FRAM), a fast NAND, or a nano random-access memory (NRAM).

In another possible implementation, the hybrid internal memory system is applied to a scenario in which a large-capacity internal memory is deployed, and the scenario includes at least one of big data, an internal memory database, or a cloud service.

In another possible implementation, the hybrid internal memory system is a server or a server cluster, and the server cluster includes two or more servers.

According to a second aspect, an apparatus for controlling an internal memory bandwidth is provided. The apparatus includes modules configured to perform the method for controlling an internal memory bandwidth in any one of the first aspect or the possible designs of the first aspect.

According to a third aspect, a processor is provided. The processor is associated with at least two different types of internal memory media, and the processor is configured to perform operation steps of the method for controlling an internal memory bandwidth in any one of the first aspect or the possible designs of the first aspect.

According to a fourth aspect, a computing device is provided. The computing device includes at least one processor, a memory, and a plurality of different types of internal memory media. The memory is configured to store a group of computer instructions, and when executing the group of computer instructions, the processor performs operation steps of the method for controlling an internal memory bandwidth in any one of the first aspect or the possible implementations of the first aspect.

According to a fifth aspect, a computer system is provided. The computer system includes a memory, at least one processor, and a plurality of different types of internal memory media. Each processor is associated with at least two different types of internal memory media. The memory is configured to store a group of computer instructions, and when executing the group of computer instructions, the processor performs operation steps of the method for controlling an internal memory bandwidth in any one of the first aspect or the possible implementations of the first aspect.

According to a sixth aspect, a computer-readable storage medium is provided, and includes computer software instructions. When the computer software instructions are run on a computing device, the computing device is enabled to perform operation steps of the method in any one of the first aspect or the possible implementations of the first aspect.

According to a seventh aspect, a computer program product is provided. When the computer program product runs on a computer, the computer is enabled to perform operation steps of the method in any one of the first aspect or the possible implementations of the first aspect.

According to an eighth aspect, a chip system is provided. The chip system includes a first processor and at least two different types of internal memory media associated with the first processor, and is configured to implement a function of the first processor in the method in the first aspect. In a possible design, the chip system further includes a memory, configured to store program instructions and/or data. The chip system may include a chip, or may include a chip and another discrete device.

Based on the implementations provided in the foregoing aspects, this disclosure may further combine technologies in this disclosure to provide more implementations.

DESCRIPTION OF EMBODIMENTS

A memory is a memory device configured to store a program and various data. A larger storage capacity of the memory indicates a lower access speed. On the contrary, a smaller storage capacity indicates a higher access speed. The access speed is a data transmission speed when data is written to or read from the memory. The access speed may also be referred to as a read/write speed. To improve system performance of a computer system, the memory may be divided into different layers based on the storage capacity and the access speed.

Figure 1:
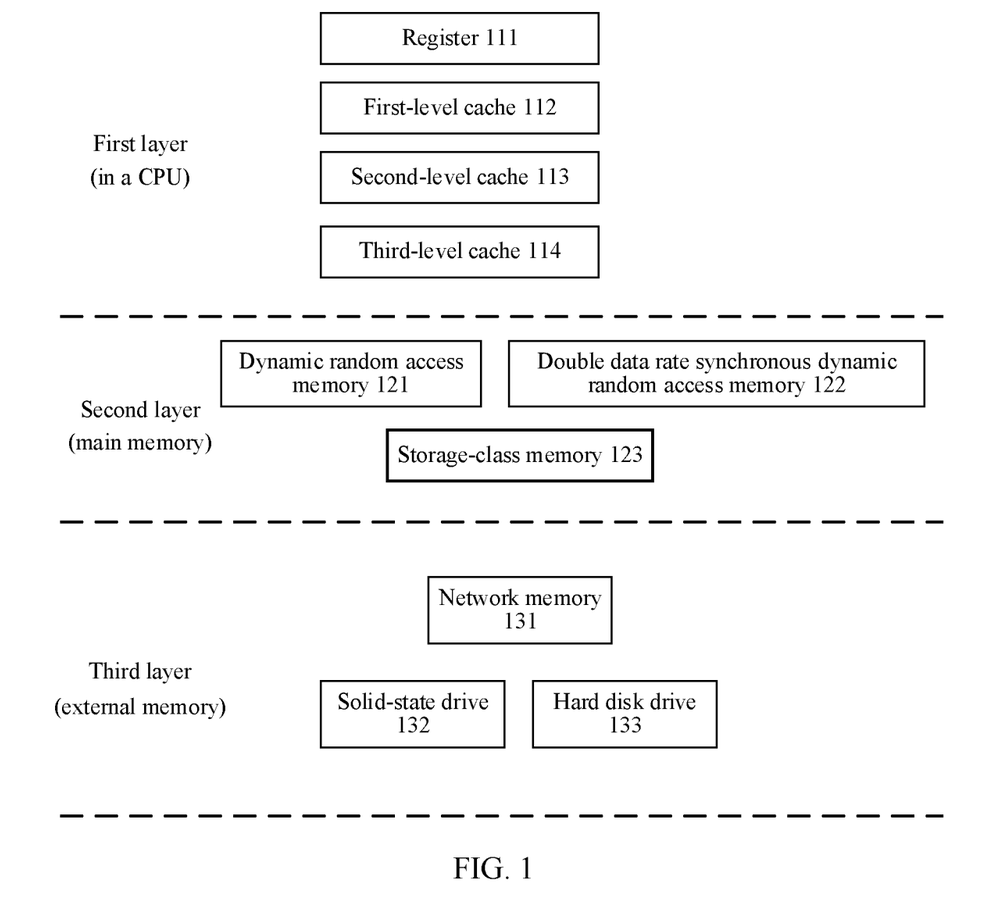
FIG. 1 is a schematic diagram of a storage system with a three-layer structure according to an embodiment of this disclosure.

FIG. 1 is a schematic diagram of a storage system with a three-layer structure according to an embodiment of this disclosure. From a first layer to a third layer, a storage capacity is increased layer by layer, an access speed is decreased layer by layer, and costs are reduced layer by layer. As shown in FIG. 1, the first layer includes a register 111, a first-level cache 112, a second-level cache 113, and a third-level cache 114 that are located in a central processing unit (CPU). A memory included in the second layer may be used as a main memory of a computer system, for example, a DRAM 121 or a double data rate synchronous dynamic random-access memory (DDR SDRAM) 122. The main memory may be briefly referred to as a main memory or an internal memory, that is, a memory that exchanges information with the CPU. A memory included in the third layer may be used as a secondary memory of the computer system, for example, a network memory 131, a solid-state drive (SSD) 132, or a hard disk drive (HDD) 133. The secondary memory may be briefly referred to as a secondary memory or an external memory. Compared with the main memory, the external memory has a large storage capacity and a low access speed. It can be learned that a memory closer to the CPU has a smaller storage capacity, a higher access speed, a larger bandwidth, and smaller access latency. For example, an access latency range of the DRAM 121 may be 50 nanoseconds (ns) to 100 nanoseconds, an access latency range of the network memory 131 may be 1 microsecond (μs) to 1000 microseconds, and an access latency range of the solid-state drive may be 100 μs. An access latency range of the hard disk drive may be 1 millisecond (ms). Therefore, the memory included in the third layer may be used as a back-end storage device. The memory included in the second layer may be used as a cache device, configured to store data frequently accessed by the CPU, to significantly improve access performance of the system.

With development of a multi-core processor, a quantity of cores of a single processor is gradually increased, and a computing speed of the processor is also continuously increased. In this case, the processor has an increasingly high requirement on an access speed and an internal memory capacity of an internal memory. In a possible implementation, a plurality of different types of storage media are used together as the internal memory, to increase the internal memory capacity, allocate as many internal memory resources and internal memory bandwidths as possible from the internal memory to each processor core, and satisfy the requirement of the processor for the access speed and the internal memory capacity of the internal memory. A system that uses the plurality of different types of storage media as the internal memory may be referred to as a hybrid internal memory system. The storage media used as the internal memory in the hybrid internal memory system may be referred to as internal memory media. For example, the plurality of different types of internal memory media include a first internal memory medium and a second internal memory medium. A storage capacity of the first internal memory medium is lower than a storage capacity of the second internal memory medium, an access speed of the first internal memory medium is higher than an access speed of the second internal memory medium, access latency of the first internal memory medium is lower than access latency of the second internal memory medium, and costs of the first internal memory medium are higher than costs of the second internal memory medium.

An SCM has both an advantage of the internal memory and a characteristic of storage. For ease of understanding, the storage-class memory is a new type of non-volatile internal memory medium. The SCM has characteristics of non-volatility, extremely short access time, low cost per bit, solidity, and no moving area. At present, there are many SCM medium technologies. A PCM is the most prominent and typical medium and is one of the earliest internal memory-class internal memory medium technologies that have been launched, for example, an Intel® Optane™ memory developed based on 3D Xpoint. In addition, the SCM further includes other types of memories such as an MRAM, an RRAM/ReRAM, an FRAM, a fast NAND, and an NRAM.

A storage capacity of the SCM may be hundreds of gigabytes (GB), and an access latency range of the SCM may be 120 ns to 400 ns. The SCM may be located at the second layer in a hierarchical architecture of the storage system shown in FIG. 1, and is, for example, a storage-class memory 123. Because the SCM has characteristics of a large storage capacity and a high access speed, the SCM and another storage medium in the second layer may be used together as the internal memory in the hybrid internal memory system. For example, the DDR SDRAM and the SCM are used as the internal memory in the hybrid internal memory system, or the DRAM and the SCM are used as the internal memory in the hybrid internal memory system.

Figure 2A:
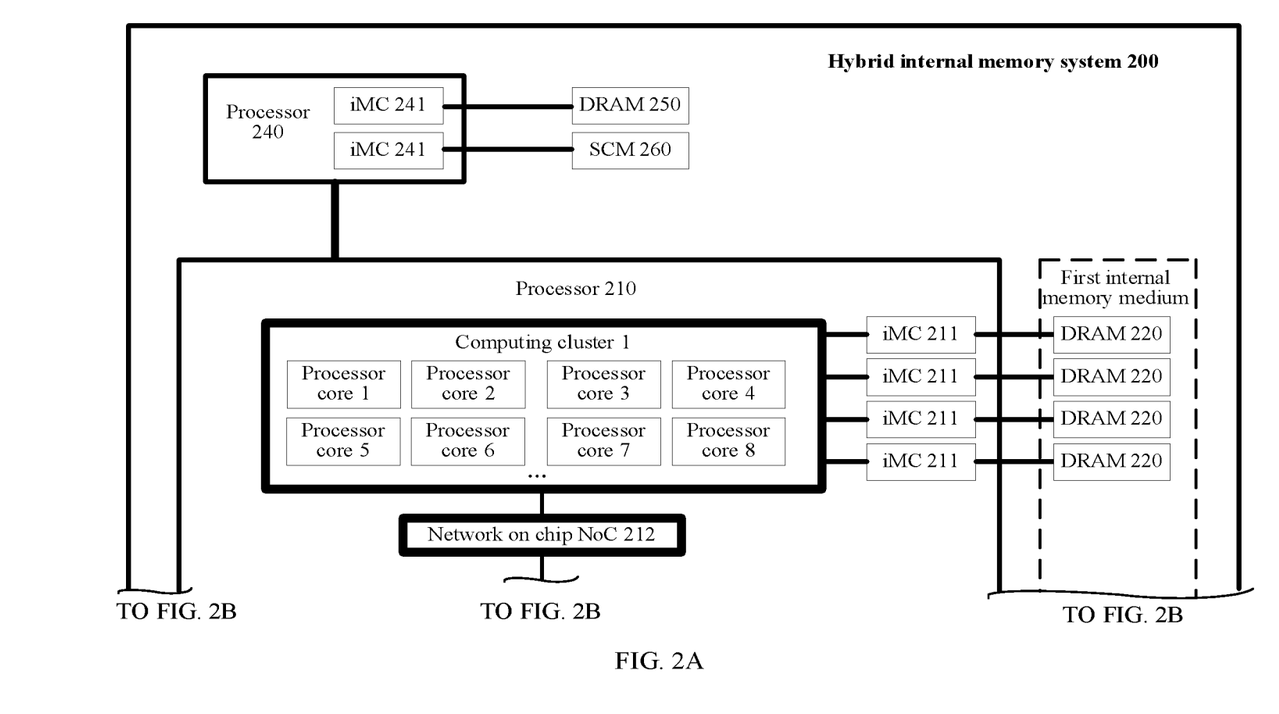
FIG. 2A and FIG. 2B are a schematic diagram of a hybrid internal memory system according to an embodiment of this disclosure.
Figure 2B:
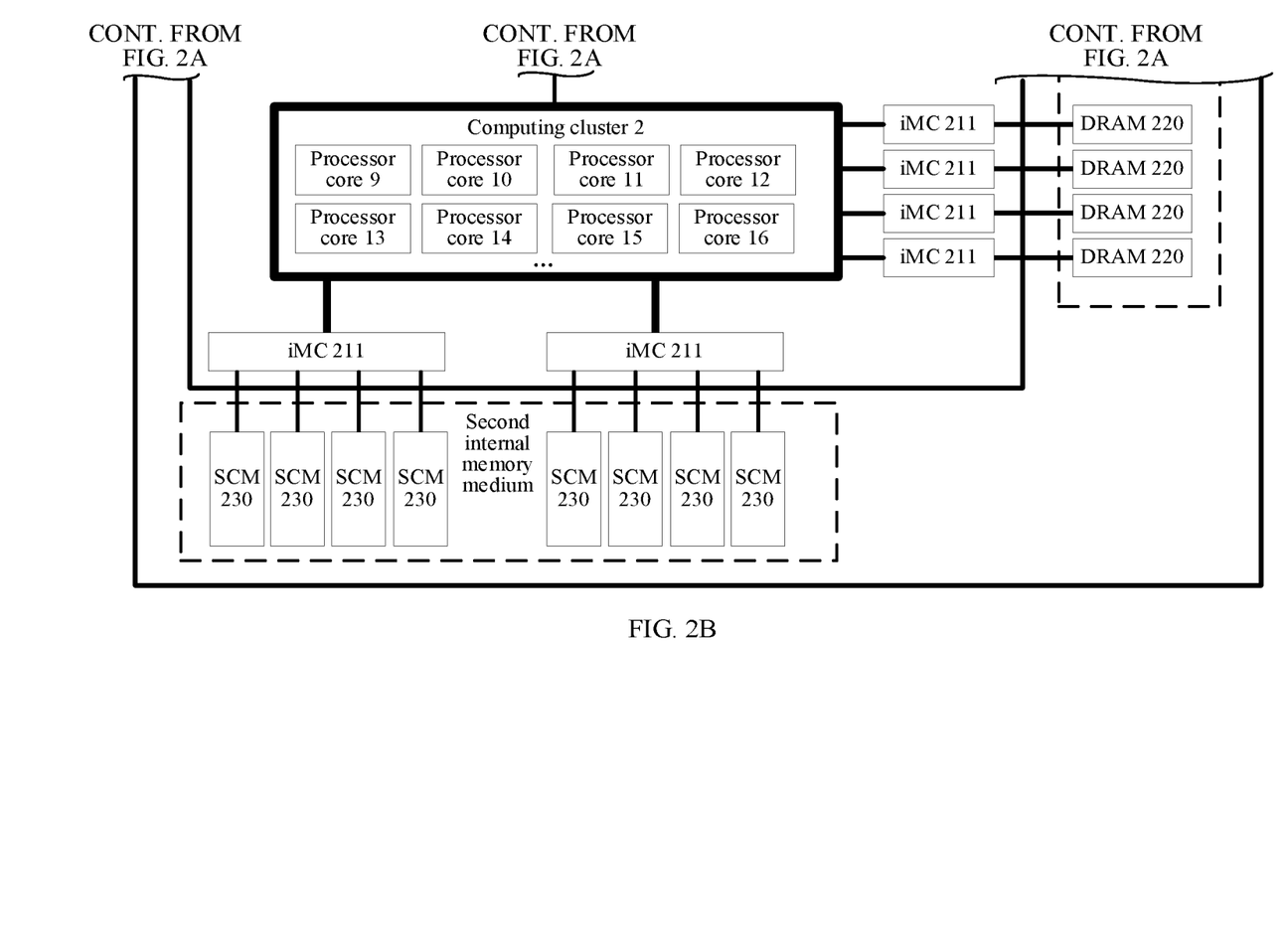

For example, FIG. 2A and FIG. 2B are a schematic diagram of a hybrid internal memory system according to an embodiment of this disclosure. As shown in FIG. 2A and FIG. 2B, the hybrid internal memory system 200 includes a plurality of processors and a plurality of different types of internal memory media. The plurality of processors is connected through a QuickPath Interconnect (QPI) interface (or referred to as a Common System Interface (CSI)). Each of the plurality of processors may be associated with at least one type of internal memory medium. To be specific, some processors are associated with one type of internal memory medium, and some processors are associated with more than two types of internal memory media. For example, the plurality of processors includes a processor 210 and a processor 240, and the plurality of different types of internal memory media include a first internal memory medium and a second internal memory medium. The first internal memory medium may include a DRAM 220 and a DRAM 250, and the second internal memory medium may include an SCM 230 and an SCM 260. The processor 210 is connected to the first internal memory medium and the second internal memory medium through an interface that supports internal memory semantics. The processor 240 is connected to the first internal memory medium and the second internal memory medium through the interface that supports internal memory semantics. The interface includes at least one interface that supports CXL, CCIX, or a UB. The processor 210 accesses the DRAM 220 as quickly as possible through a parallel interface (for example, the UB) to perform a data read/write operation, to increase a data processing speed of the processor 210. The processor 210 is connected to the SCM 230 through a serial interface with a higher rate (for example, the CXL) to expand an internal memory, so that more internal memory channels can be expanded, thereby obtaining more internal memory bandwidths and internal memory capacities, and resolving a problem that the internal memory cannot match an increase of a processor core. In addition, compared with access latency that the processor accesses an internal memory connected through the parallel interface, access latency that the processor accesses an internal memory connected through the serial interface is larger. A configuration ratio of a quantity of internal memories connected through the serial interface to a quantity of internal memories connected through the parallel interface in internal memories is adjusted, to satisfy a requirement of the processor for an access speed and an internal memory capacity of the internal memory.

The processor 210 further includes a plurality of processor cores and an integrated memory controller (iMC) 211 configured to implement internal memory management and control. The plurality of processor cores may be further divided into a plurality of computing clusters, and each computing cluster includes a plurality of processor cores. For example, as shown in FIG. 2A and FIG. 2B, a computing cluster 1 includes processor cores 1 to 8. A computing cluster 2 includes processor cores 9 to 16. The plurality of computing clusters communicates with each other through a network on chip (NoC) 212, and the network on chip 212 is configured to implement communication between processor cores in different computing clusters. For a processor with an X86 architecture, the network on chip 212 may be a node controller (NC). For a processor with an Advanced Reduced Instruction Set Computing Machine (ARM) architecture, the network on chip 212 may be a chip or a logic circuit configured to implement communication between the processor cores. Each computing cluster is connected to the different types of internal memory media through a plurality of integrated memory controllers 211. Optionally, all the processor cores in the processor 210 may alternatively be divided into one computing cluster.

It should be noted that the hybrid internal memory system 200 shown in FIG. 2A and FIG. 2B is described by using only the processor 210 and the processor 240 as an example. During specific implementation, the hybrid internal memory system 200 may include two or more processors, and each processor is connected to the different types of internal memory media through the iMCs.

Optionally, in addition to being integrated into the processor of the hybrid internal memory system 200 as shown in FIG. 2A and FIG. 2B, the iMC 211 may also be used as an endpoint device in the hybrid internal memory system 200 in a form of an off-chip chip outside the processor. In this case, the iMC 211 is used as an internal memory expander.

Optionally, the hybrid internal memory system 200 is a hybrid internal memory system. In addition to the first internal memory medium and the second internal memory medium, the hybrid internal memory system 200 may further include another type of internal memory medium. The type of the internal memory medium is different from a type of the first internal memory medium and a type of the second internal memory medium. For example, at least one of types of internal memory media such as a RAM or a static random-access memory (SRAM), a synchronous dynamic random-access memory (SDRAM), and a DDR SDRAM may be further added to the hybrid internal memory system 200. In this case, the hybrid internal memory system 200 includes a plurality of types of hybrid internal memory media. For ease of description, the following embodiments of this disclosure are described by using an example in which the hybrid internal memory system 200 includes only the first internal memory medium and the second internal memory medium, the first internal memory medium is a DRAM, and the second internal memory medium may be an SCM.

It should be noted that, in an initialization phase, an operating system running on the processors of the hybrid internal memory system may allocate different levels of internal memory media to the processors based on types of the internal memory media, and record a correspondence between the processors and the internal memory media, to perform a data read or write operation based on the correspondence between the processors and the different levels of internal memory media.

An internal memory resource may be allocated to each processor based on a hierarchical internal memory mechanism. The hierarchical internal memory mechanism indicates levels of the plurality of different types of internal memory media in the hybrid internal memory system. The hybrid internal memory system includes a plurality of levels. Because physical attributes of internal memory media produced by different manufacturers may be different, the processor may divide internal memory media in a multi-level internal memory system into different levels based on physical attributes of the internal memory media. The physical attributes include at least one of latency, costs, a life, and an internal memory capacity. In this case, the processor may divide the internal memory media in the multi-level internal memory system into a plurality of levels based on at least one of the latency, the costs, the life, and the internal memory capacity. The plurality of levels may be sorted in descending order of a first level, a second level, and other levels. For example, if an access speed of the DRAM is greater than an access speed of the SCM, access latency of the DRAM is less than access latency of the SCM. Therefore, the DRAM may be used as a first-level internal memory medium, and the SCM may be used as a second-level internal memory medium, where the first level is higher than the second level.

In addition, internal memory media of a same type may be divided into one or more levels. For example, the internal memory media of the same type are divided into two or more levels based on at least one of the physical attributes. For example, because costs of producing DRAMs by different manufacturers may be different, a low-cost DRAM may be used as a first-level internal memory medium, and a high-cost DRAM may be used as a second-level internal memory medium.

In this way, the plurality of different types of internal memory media are configured to expand an internal memory capacity of the system, so that the processor can obtain as many internal memory resources as possible when running an application. In addition, after obtaining an internal memory allocation request, any processor (for example, a first processor) in the system determines, under an indication of an allocation policy, a to-be-allocated internal memory resource from the plurality of different types of internal memory media based on the physical attributes (where for example, the physical attributes include at least one of the internal memory capacity, the access latency, the costs, or the service life) of the plurality of different types of internal memory media, and allocates the internal memory resource to a logical address according to the allocation policy, to ensure that access latency that the first processor accesses the allocated internal memory resource is as low as possible, so that an access speed and an internal memory capacity of the internal memory medium satisfy a computing speed of the processor as much as possible. In addition, on the premise that performance is not affected, a low-cost and large-capacity SCM and a low-latency DRAM are used as a combination of the hybrid internal memory medium to store different data in a hierarchical manner. This may reduce hardware costs of the system.

Compared with a case in which an internal memory is divided into a huge-page resource in advance because of a huge page before an application uses an internal memory resource, and a processor uses a statically allocated huge-page resource, in this disclosure, the processor dynamically allocates the internal memory resource to a running application based on the physical attributes of the plurality of different types of internal memory media, to ensure that a state of the system after initial internal memory allocation is completed is an optimal internal memory performance state, and reduce impact on application performance. In addition, the processor releases, based on a release instruction, the internal memory resource allocated to the running application based on the physical attributes of the plurality of different types of internal memory media, so that the internal memory resource can be used by another application, thereby improving utilization of the internal memory resource.

However, the access speed of the SCM is lower than the access speed of the DRAM. Compared with a total system bandwidth when the processor uses only the DRAM to read/write data, a total system bandwidth when the processor uses both the SCM and the DRAM to read/write data is decreased. Therefore, access latency of accessing the internal memory when the processor runs the application is increased, as shown in Table 1.

TABLE 1

| | Total bandwidth (GB/second (s)) | |
|---|---|---|
| | Access the DRAM through five threads | Access the DRAM through five threads and access the SCM through another five threads |
| Sequential read | 53 | 27 |
| Random read | 28 | 29 |
| Sequential read | 23 | 11 |
| Random read | 23 | 3 |

It can be learned from Table 1 that, regardless of sequential read or random read, a total system bandwidth of accessing the DRAM through five threads is greater than a total system bandwidth of accessing the DRAM through five threads and accessing the SCM through another five threads. Compared with the total system bandwidth of accessing the DRAM through five threads, the total system bandwidth of accessing the DRAM through five threads and accessing the SCM through another five threads is decreased by up to 87%.

According to a method for controlling an internal memory bandwidth provided in this disclosure, after accessing a bandwidth required by a to-be-accessed internal memory medium, a first processor obtains an occupancy rate of an internal memory bandwidth of the to-be-accessed internal memory medium. If determining, based on the occupancy rate of the internal memory bandwidth, that the to-be-accessed internal memory medium cannot satisfy a bandwidth requirement, the first processor adjusts, under an indication of a bandwidth adjustment policy, the occupancy rate of the internal memory bandwidth based on a factor that affects the occupancy rate of the internal memory bandwidth of the to-be-accessed internal memory medium, and uses a first bandwidth that satisfies the bandwidth requirement in an adjusted remaining bandwidth of the to-be-accessed internal memory medium. In this way, a remaining bandwidth of an internal memory medium is dynamically adjusted, so that the to-be-accessed internal memory medium can provide an application run by the processor with a sufficient bandwidth for use, to ensure an overall access speed of accessing an internal memory by the processor.

The factor that affects the occupancy rate of the internal memory bandwidth of the to-be-accessed internal memory medium includes at least one of a user-oriented application and a system-oriented application that are run by the first processor. For example, the user-oriented application includes a big data application, a database application, and a cloud service application. The system-oriented application includes an operating system management application, internal memory copy, and data migration.

At least two different types of internal memory media associated with the first processor include a first internal memory medium and a second internal memory medium. An internal memory medium (namely, the to-be-accessed internal memory medium) to be accessed by the first processor may be the first internal memory medium associated with the first processor or the second internal memory medium associated with the first processor; and/or the internal memory medium to be accessed by the first processor is a first internal memory medium associated with a processor adjacent to the first processor or a second internal memory medium associated with the processor adjacent to the first processor.

Figure 3:
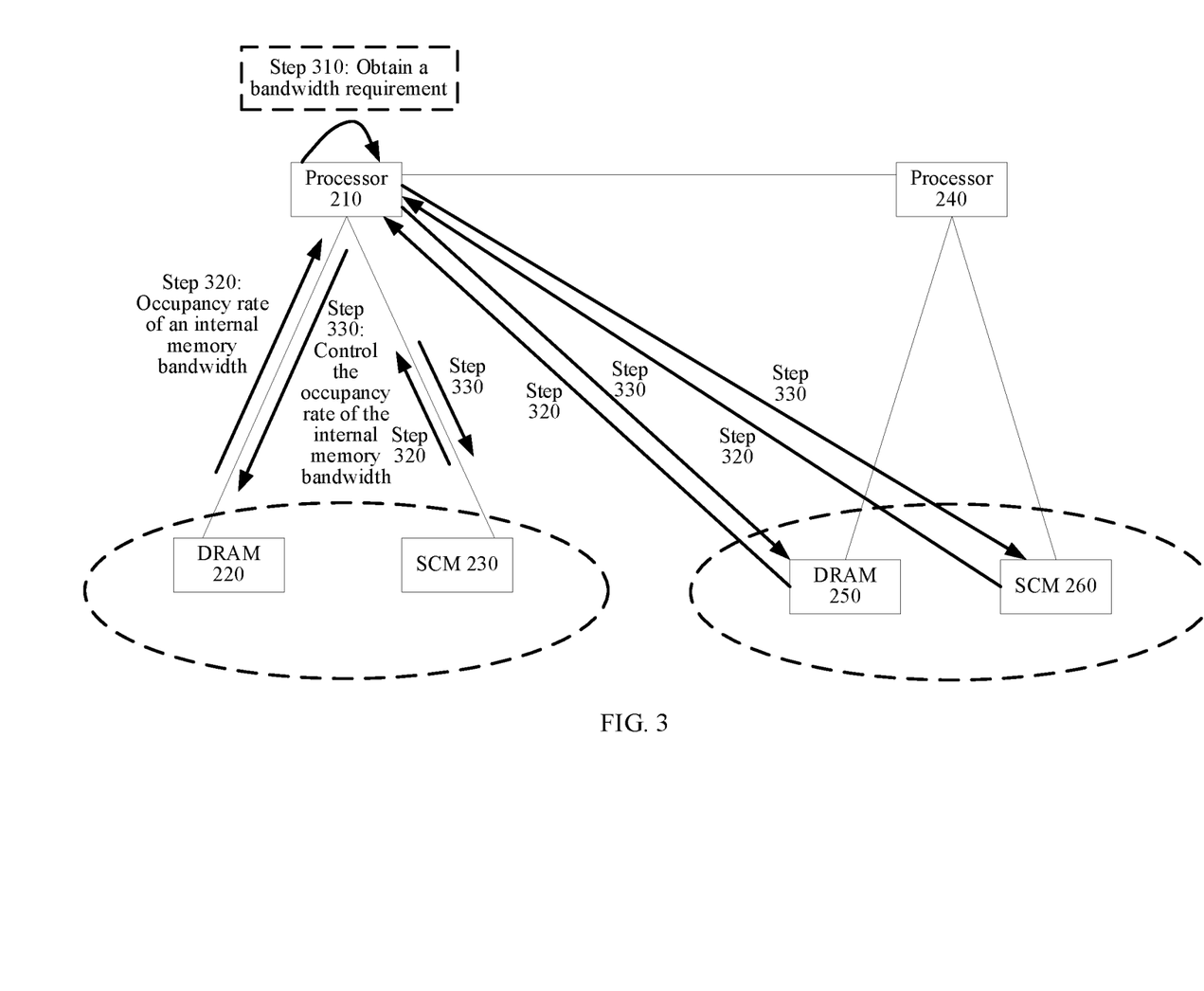
FIG. 3 is a schematic flowchart of a method for controlling an internal memory bandwidth according to an embodiment of this disclosure.

The following describes, with reference to FIG. 3 in detail, the method for controlling an internal memory bandwidth provided in embodiments of this disclosure. FIG. 3 is a schematic flowchart of a method for controlling an internal memory bandwidth according to an embodiment of this disclosure. Herein, a hybrid internal memory system 200 is used as an example for description. A DRAM 220 and a DRAM 250 are used as first-level internal memory media. An SCM 230 and an SCM 260 are used as second-level internal memory media. A processor 210 is associated with the DRAM 220 and the SCM 230. A processor 240 is associated with the DRAM 250 and the SCM 260. It is assumed that the processor 210 accesses the internal memory medium in a process of running an application. As shown in FIG. 3, the method includes the following steps.

Step 310: The processor 210 obtains a bandwidth requirement of a to-be-accessed internal memory medium.

The bandwidth requirement is a bandwidth required by the processor 210 to access the to-be-accessed internal memory medium. It may be understood that, when accessing the to-be-accessed internal memory medium, the processor 210 expects a data amount of data processed by the internal memory medium in unit time to reach a bandwidth threshold.

Step 320: The processor 210 obtains an occupancy rate of an internal memory bandwidth of the to-be-accessed internal memory medium.

The processor 210 may collect statistics on a real-time bandwidth of a to-be-accessed internal memory medium occupied by a running user-oriented application and/or a running system-oriented application. The processor 210 may determine an occupancy rate of an internal memory bandwidth of the to-be-accessed internal memory medium based on a ratio of the real-time bandwidth of the to-be-accessed internal memory medium to a total bandwidth of the to-be-accessed internal memory medium.

For example, the processor 210 may collect statistics on a specific hardware event occurring in the system. The specific hardware event includes, for example, a cache miss or branch misprediction. A plurality of events may be combined to calculate some performance data such as a cycle per instruction (CPI) and a cache hit rate. The processor 210 calculates, by reading the specific hardware event or the performance data, a real-time bandwidth of an internal memory medium accessed by the processor 210.

The processor 210 may further obtain a remaining bandwidth of the internal memory medium accessed by the processor 210. The processor 210 may determine the remaining bandwidth of the internal memory medium based on a difference between a total bandwidth and the real-time bandwidth of the internal memory medium. The total bandwidth is a bandwidth determined by hardware of the internal memory medium.

The processor 210 may obtain a remaining bandwidth of at least one of the DRAM 220, the SCM 230, the DRAM 250, or the SCM 260 that can be accessed by the processor 210. For ease of description, descriptions are provided by using an example in which the processor 210 accesses the DRAM 220, where it is determined that the DRAM 220 cannot satisfy a bandwidth requirement based on an occupancy rate of an internal memory bandwidth of the DRAM 220, and the occupancy rate of the internal memory bandwidth of the DRAM 220 is adjusted.

A bandwidth adjustment condition includes at least one of the following: the remaining bandwidth of the internal memory medium is less than a bandwidth threshold or the remaining bandwidth does not satisfy an internal memory bandwidth requirement of the application run by the processor 210.

In some embodiments, the processor 210 determines whether the remaining bandwidth of the DRAM 220 is less than the bandwidth threshold. If the remaining bandwidth of the DRAM 220 is greater than or equal to the bandwidth threshold, it indicates that the remaining bandwidth of the DRAM 220 is sufficient, and may support a required bandwidth allocated to the processor 210 to run the application, and bandwidth adjustment does not need to be performed. If the remaining bandwidth of the DRAM 220 is less than the bandwidth threshold, it indicates that a bandwidth of the DRAM 220 is excessively occupied, and may not support a required bandwidth allocated to the processor 210 to run the application, and step 330 is performed.

The bandwidth threshold is obtained based on the total bandwidth of the internal memory medium and an adjustment factor. For example, the internal memory medium accessed by the processor 210 is the DRAM 220. The bandwidth threshold satisfies the following Formula (1):

$$P_{DRAM} = \alpha \cdot B_{DRAM} \quad \text{Formula (1)}$$

$P_{DRAM}$ represents a bandwidth threshold of a DRAM, $B_{DRAM}$ represents a total bandwidth of the DRAM, and a represents the adjustment factor, where a value range of the adjustment factor is 0 to 1.

In some other embodiments, the processor 210 may obtain the internal memory bandwidth requirement of the application run by the processor 210. The processor 210 determines whether the remaining bandwidth of the DRAM 220 satisfies the internal memory bandwidth requirement. If the remaining bandwidth of the DRAM 220 satisfies the internal memory bandwidth requirement, bandwidth adjustment does not need to be performed. If the remaining bandwidth of the DRAM 220 does not satisfy the internal memory bandwidth requirement, step 330 is performed.

Step 330: The processor 210 adjusts the occupancy rate of the internal memory bandwidth of the DRAM 220 according to a bandwidth adjustment policy, and uses a first bandwidth that satisfies the bandwidth requirement in an adjusted remaining bandwidth of the DRAM 220.

The processor 210 controls a factor that affects the occupancy rate of the internal memory bandwidth of the DRAM 220 to occupy the bandwidth of the DRAM 220, to obtain the adjusted remaining bandwidth, where the adjusted remaining bandwidth is greater than the remaining bandwidth before adjustment. It may be understood that an adjusted occupancy rate of the internal memory bandwidth of the DRAM 220 is less than the occupancy rate of the internal memory bandwidth of the DRAM 220 before adjustment. In other words, the processor 210 controls the factor that affects the occupancy rate of the internal memory bandwidth of the DRAM 220 to use the bandwidth of the DRAM 220.

For example, because hardware costs of the SCM are lower than hardware costs of the DRAM, the SCM stores cold data. This may reduce storage costs of the system. Because an access speed of the DRAM is higher than an access speed of the SCM, the DRAM stores hot data. This may decrease access latency that the processor accesses the hot data, and increase a data processing speed of the processor 210.

The hot data is data that is accessed in a unit cycle for a quantity of times greater than a first threshold.

The cold data is data that is accessed in a unit cycle for a quantity of times less than or equal to a second threshold. The first threshold and the second threshold may be the same or different. When the first threshold and the second threshold are different, the first threshold is greater than the second threshold.

It should be noted that the processor 210 includes a register configured to record a page table management flag bit (access bit). The processor 210 may determine whether an internal memory page is accessed in a fixed cycle, count a quantity of times of access, and define the first threshold and the second threshold based on distribution of times of access, to determine whether data is cold or hot.

Therefore, cold data stored in the SCM 230 may become hot data. If the SCM 230 stores the hot data, the processor 210 frequently accesses the SCM 230, and consequently, overall access latency of the system is increased. Hot data stored in the DRAM 220 may become cold data. If the DRAM 220 stores the cold data, storage space of the DRAM 220 is wasted.

Therefore, the processor 210 may determine a data migration policy based on data distribution in the hybrid internal memory system, to implement migration and processing of a migration data set with a cold or hot attribute identifier between different internal memory media, and reduce storage costs of the system. If the processor 210 frequently migrates data, to be specific, migrates, to the SCM 230, the cold data stored in the DRAM 220, and migrates, to the DRAM 220, the hot data stored in the SCM 230, an excessive bandwidth of the internal memory medium is occupied, in other words, an occupancy rate of the internal memory bandwidth is high. The remaining bandwidth of the internal memory medium accessed by the processor 210 may not support the required bandwidth allocated to the processor 210 to run the application. In this case, the processor 210 may perform bandwidth adjustment on the remaining bandwidth of the internal memory medium according to the method for controlling an internal memory bandwidth provided in this disclosure.

For example, the processor 210 determines a limited available bandwidth of the DRAM 220 based on the remaining bandwidth and the bandwidth threshold, and controls, based on the limited available bandwidth, the factor that affects the occupancy rate of the internal memory bandwidth of the DRAM 220 to access the DRAM 220, to obtain the adjusted remaining bandwidth.

The limited available bandwidth satisfies Formula (2):

$$S_{DRAM} = (P_{DRAM} - A_{DRAM}) \cdot T * \beta + K \quad \text{Formula (2)}$$

$S_{DRAM}$ represents the limited available bandwidth, $P_{DRAM}$ represents the bandwidth threshold, and $A_{DRAM}$ represents the remaining bandwidth. β represents an integer, and K represents a constant. T represents time.

In some embodiments, if T is greater than 0, $S_{DRAM}$ represents SDRAM DRAM pages of the DRAM 220 that are migrated in and out in unit time. If the DRAM is replaced with the SCM, $S_{SCM}$ represents $S_{SCM}$ SCM pages of the SCM 230 that are migrated in and out in unit time.

It should be noted that, based on current development in the computer field, internal memory pages are usually divided into different specifications, for example, 4 kilobytes (kB), 2 megabytes (MB), and 1 GB. A 4 KB internal memory page is also referred to as a small page or a small-page internal memory, and a 2 MB internal memory page or 1 GB internal memory page is referred to as a huge page or a huge-page internal memory. Alternatively, an internal memory page whose internal memory page size is greater than a third threshold is referred to as a huge page or a huge-page internal memory, and an internal memory page whose internal memory page size is less than or equal to a fourth threshold is referred to as a small page or a small-page internal memory. The third threshold and the fourth threshold may be the same or different. During specific implementation, the third threshold and the fourth threshold may be configured based on a service requirement.

In a possible implementation, for a large-capacity internal memory scenario, to improve data processing efficiency, the huge-page internal memory is usually used to process data. For example, when the processor allocates the internal memory based on an internal memory allocation request, the internal memory may be allocated based on the huge page. Compared with a case of allocating an internal memory based on a 4 KB small page by a processor, this reduces a probability that a miss occurs when the processor accesses a translation look aside buffer (TLB) or a page table, and reduces a large quantity of interrupts generated when the processor accesses the internal memory. Therefore, pages that are migrated in and out may be huge pages. The translation look aside buffer is also referred to as a page table buffer, is a high-speed storage unit located in the processor, and stores some page table files (including a table page table of translation from a virtual address to a physical address). If the "page table" is stored in a main memory, prices of querying the page table are high, and the TLB located in the memory may improve efficiency of translation from the virtual address to the physical address.

The processor 210 may access, based on the first bandwidth, internal memory space allocated at a preset internal memory allocation granularity in the DRAM 220, where the preset internal memory allocation granularity is greater than a page size of the internal memory medium. For example, the preset internal memory allocation granularity is the huge page.

During actual application, the processor 210 may perform bandwidth adjustment on the remaining bandwidth of at least one of the DRAM 220, the SCM 230, the DRAM 250, or the SCM 260 based on step 310 to step 330, so that the DRAM 220, the SCM 230, the DRAM 250, and the SCM 260 ensure a sufficient remaining bandwidth to be allocated to the application.

In this way, in a collaborative control procedure, bandwidths of an SCM and a DRAM consumed by data migration may be controlled below a specified bandwidth threshold, to ensure that a remaining bandwidth allocated to an application is greater than a fixed proportion of a total bandwidth, and quality of service (QOS) assurance under this proportion can be provided for the application.

It may be understood that, to implement functions in the foregoing embodiments, the hybrid internal memory system includes corresponding hardware structures and/or software modules for performing the functions. A person skilled in the art should be easily aware that, in this disclosure, the units and method steps in the examples described with reference to embodiments disclosed in this disclosure can be implemented by hardware or a combination of hardware and computer software. Whether a function is performed by hardware or hardware driven by computer software depends on particular application scenarios and design constraints of the technical solutions.

The foregoing describes, with reference to FIG. 1 to FIG. 3 in detail, the method for controlling an internal memory bandwidth provided in embodiments. The following describes, with reference to FIG. 4, an apparatus for controlling an internal memory bandwidth provided in embodiments.

Figure 4:
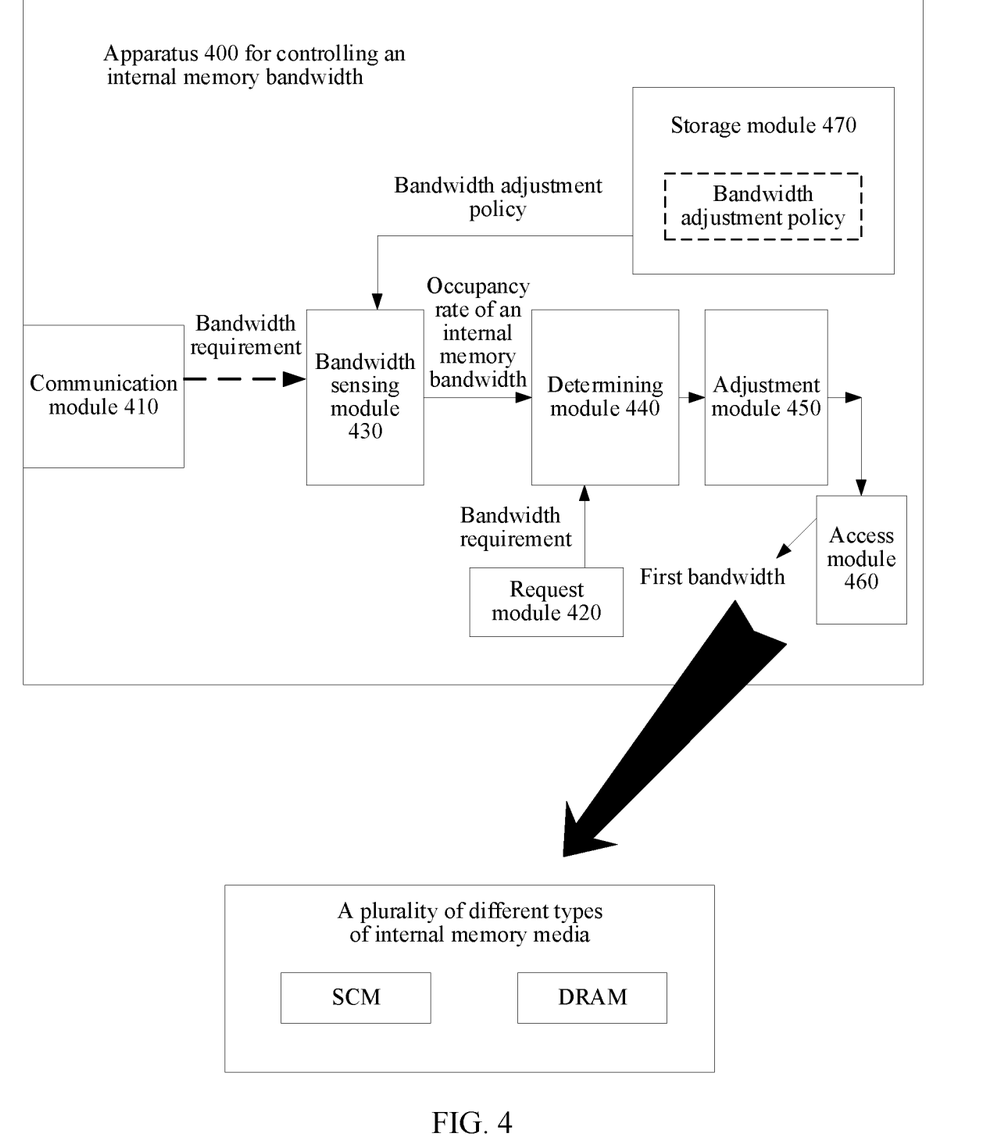
FIG. 4 is a schematic diagram of a structure of an apparatus for controlling an internal memory bandwidth according to this disclosure.

FIG. 4 is a schematic diagram of a structure of a possible apparatus for controlling an internal memory bandwidth according to an embodiment. These apparatuses for controlling an internal memory bandwidth may be configured to implement a function of the first processor in the foregoing method embodiments, and therefore can also implement beneficial effects of the foregoing method embodiments. In this embodiment, the apparatus for controlling an internal memory bandwidth may be the processor 210 shown in FIG. 3, or may be a module (for example, a chip) used in a server.

As shown in FIG. 4, the apparatus 400 for controlling an internal memory bandwidth includes a communication module 410, a request module 420, a bandwidth sensing module 430, a determining module 440, an adjustment module 450, and an access module 460. The apparatus 400 for controlling an internal memory bandwidth is configured to implement a function of the processor 210 in the method embodiment shown in FIG. 3.

The communication module 410 is configured to communicate with another device, for example, receive a bandwidth requirement sent by the other device.

The request module 420 is configured to obtain a bandwidth requirement of a to-be-accessed internal memory medium, where the bandwidth requirement is a bandwidth required by the first processor to access the to-be-accessed internal memory medium. For example, the request module 420 is configured to perform step 310 in FIG. 3.

The bandwidth sensing module 430 is configured to obtain an occupancy rate of an internal memory bandwidth of the to-be-accessed internal memory medium. For example, the bandwidth sensing module 430 is configured to perform step 320 in FIG. 3.

The determining module 440 is configured to determine, based on the occupancy rate of the internal memory bandwidth, that the to-be-accessed internal memory medium cannot satisfy the bandwidth requirement.

The adjustment module 450 is configured to adjust the occupancy rate of the internal memory bandwidth according to a bandwidth adjustment policy, where the bandwidth adjustment policy indicates to adjust the internal memory bandwidth based on a factor that affects the occupancy rate of the internal memory bandwidth of the to-be-accessed internal memory medium, and the factor that affects the occupancy rate of the internal memory bandwidth of the to-be-accessed internal memory medium includes at least one of a user-oriented application and a system-oriented application that are run by the first processor. For example, the bandwidth sensing module 430 is configured to perform step 330 in FIG. 3.

The access module 460 is configured to use a first bandwidth that satisfies the bandwidth requirement in an adjusted remaining bandwidth of the to-be-accessed internal memory medium.

Optionally, the adjustment module 450 is configured to control the factor that affects the occupancy rate of the internal memory bandwidth of the to-be-accessed internal memory medium to occupy the bandwidth of the to-beaccessed internal memory medium, to obtain the adjusted remaining bandwidth, where the adjusted remaining bandwidth is greater than a remaining bandwidth before adjustment.

A storage module 470 may correspond to the foregoing method embodiments, and is configured to store the bandwidth adjustment policy.

It should be understood that the apparatus 400 for controlling an internal memory bandwidth in this embodiment of this disclosure may be implemented by using a graphics processing unit (GPU), a neural network processing unit (NPU), an application-specific integrated circuit (ASIC), or a programmable logic device (PLD). The PLD may be a complex programmable logical device (CPLD), a field-programmable gate array (FPGA), a generic array logic (GAL), or any combination thereof. When the method for controlling an internal memory bandwidth shown in FIG. 3 is implemented by software, the apparatus 400 for controlling an internal memory bandwidth and each module thereof may alternatively be software modules.

The apparatus 400 for controlling an internal memory bandwidth according to this embodiment of this disclosure may correspondingly perform the method described in embodiments of this disclosure, and the foregoing and other operations and/or functions of the units in the apparatus 400 for controlling an internal memory bandwidth are respectively used to implement corresponding procedures of the method in FIG. 3. For brevity, details are not described herein again.

Figure 5:
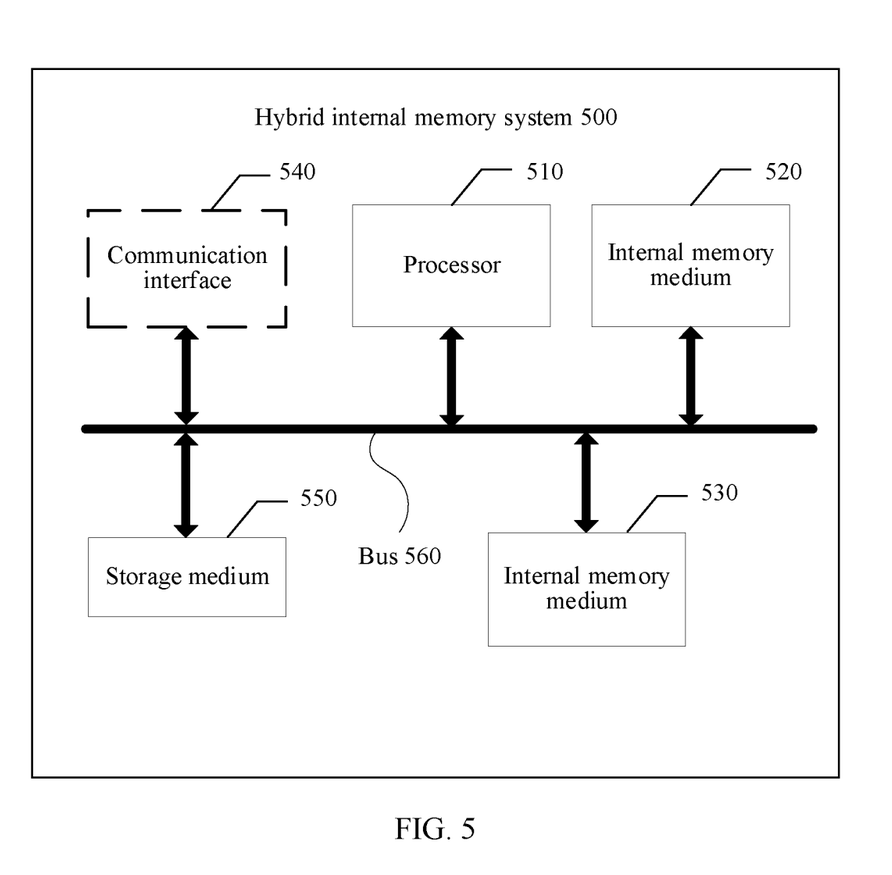
FIG. 5 is a schematic diagram of a structure of a computing device according to this disclosure.

FIG. 5 is a schematic diagram of a hybrid internal memory system 500 according to an embodiment of this disclosure. As shown in the figure, the hybrid internal memory system 500 includes a processor 510, a plurality of different types of internal memory media (for example, an internal memory medium 520 and an internal memory medium 530), a communication interface 540, a storage medium 550, and a bus 560. The processor 510, the internal memory medium 520, the internal memory medium 530, the communication interface 540, and the storage medium 550 communicate with each other through the bus 560, or may communicate with each other by using another means, for example, wireless transmission. The plurality of types of internal memory media (for example, the internal memory medium 520) may be configured to store computer-executable instructions, and the processor 510 is configured to execute the computer-executable instructions stored in the internal memory medium 520. The internal memory medium 520 stores the computer-executable instructions, and the processor 510 may invoke the computer-executable instructions stored in the internal memory medium 520 to perform the following operations: obtaining a bandwidth requirement of a to-be-accessed internal memory medium, where the bandwidth requirement is a bandwidth required by a first processor to access the to-be-accessed internal memory medium; obtaining an occupancy rate of an internal memory bandwidth of the to-be-accessed internal memory medium; determining, based on the occupancy rate of the internal memory bandwidth, that the to-be-accessed internal memory medium cannot satisfy the bandwidth requirement; and adjusting the occupancy rate of the internal memory bandwidth according to a bandwidth adjustment policy, and using a first bandwidth that satisfies the bandwidth requirement in an adjusted remaining bandwidth of the to-be-accessed internal memory medium, where the bandwidth adjustment policy indicates to adjust the internal memory bandwidth based on a factor that affects the occupancy rate of the internal memory bandwidth of the to-be-accessed internal memory medium.

It should be understood that, in this embodiment of this disclosure, the processor 510 may be a CPU, for example, a processor with an X56 architecture or a processor with an ARM architecture. The processor 510 may alternatively be another general-purpose processor, a digital signal processor (DSP), an ASIC, an FPGA or another programmable logic device, a discrete gate or a transistor logic device, a discrete hardware component, a system on chip (SoC), a GPU, an AI chip, or the like. The general-purpose processor may be a microprocessor, any other processor, or the like.

The internal memory medium 520 may include a read-only memory (ROM) and a RAM, and provide instructions and data for the processor 510. The internal memory medium 520 may further include a non-volatile random-access memory. The internal memory medium 520 may be a volatile memory or a non-volatile memory, or may include both the volatile memory and the non-volatile memory. The non-volatile memory may be a ROM, a programmable read-only memory (PROM), an erasable programmable read-only memory (EPROM), an electrically erasable programmable read-only memory (EEPROM), or a flash memory. The volatile memory may be a RAM, and is used as an external cache. By way of example but not limitative description, many forms of RAMs may be used, for example, an SRAM, a DRAM, an SDRAM, a DDR SDRAM, an enhanced synchronous dynamic random-access memory (ESDRAM), a synchlink dynamic random-access memory (SLDRAM), and a direct Rambus random-access memory (DR RAM). Optionally, the internal memory medium 520 may alternatively be an SCM, and the SCM includes at least one of a PCM, an MRAM, an RRAM, an FRAM, a fast NAND, or an NRAM.

A type of the internal memory medium 530 is similar to a type of the internal memory medium 520, or may be any one of the foregoing various internal memory medium types. However, in the hybrid internal memory system 500, the type of the internal memory medium 520 is different from the type of the internal memory medium 530.

In addition to a data bus, the bus 560 may further include a power bus, a control bus, a status signal bus, and the like. However, for clear description, various buses are all marked as the bus 560 in the figure. The bus 560 may be a Peripheral Component Interconnect Express (PCIe) bus, an Extended Industry Standard Architecture (EISA) bus, a UB, a CXL, CCIX, or the like. The bus 560 may be classified into an address bus, a data bus, a control bus, and the like.

It should be noted that, although one processor 510 is used as an example in the hybrid internal memory system 500 shown in FIG. 5, during specific implementation, the hybrid internal memory system 500 may include a plurality of processors, and a quantity of processor cores included in each processor is not limited. In addition, in FIG. 5, only the system including two different types of internal memory media is used as an example. During specific implementation, more internal memory media may be included, and types of the internal memory media are different, to implement hierarchical storage of data in the hybrid internal memory system based on physical attributes of the different types of internal memory media.

It should be understood that the hybrid internal memory system 500 according to this embodiment of this disclosure may correspond to the apparatus 400 for controlling an internal memory bandwidth in the embodiment of this disclosure, and may correspond to a corresponding body in the method according to embodiments of this disclosure. In addition, the foregoing and other operations and/or functions of the modules in the hybrid internal memory system 500 are respectively used to implement corresponding procedures of the method in FIG. 3. For brevity, details are not described herein again.

This disclosure further provides a processor. The processor includes an integrated circuit, where the integrated circuit is connected to a plurality of different types of internal memory media, and the integrated circuit is configured to implement functions of the operation steps in the method shown in FIG. 3. For brevity, details are not described herein again.

Figure 6:
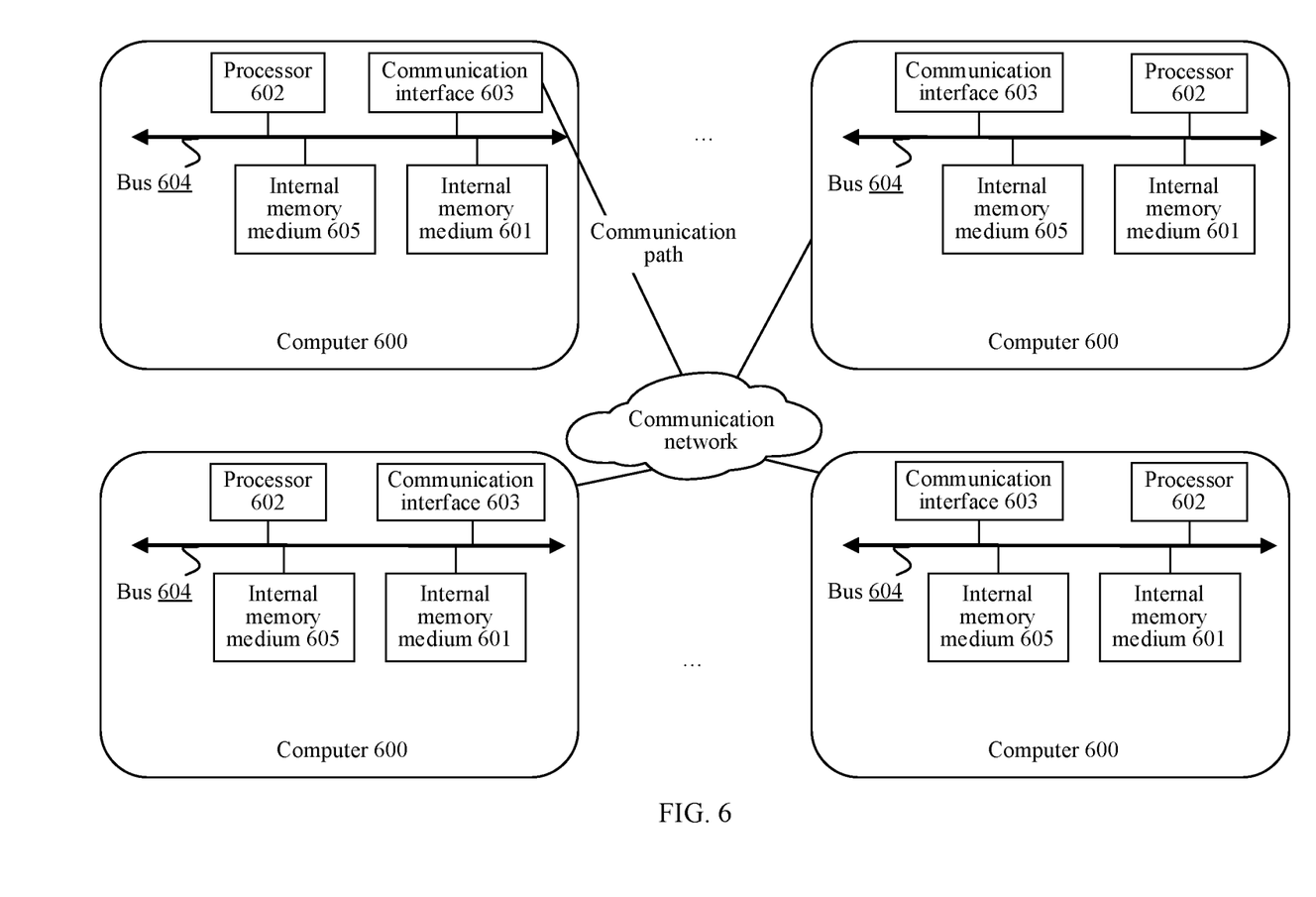
FIG. 6 is a schematic diagram of a computer system according to this disclosure.

Because the modules in the apparatus 400 for controlling an internal memory bandwidth provided in this disclosure may be deployed on a plurality of computers in the same environment or different environments in a distributed manner, this disclosure further provides a computer system shown in FIG. 6. The computer system includes a plurality of computers 600, and each computer 600 includes an internal memory medium 601, a processor 602, a communication interface 603, a bus 604, and an internal memory medium 605. The internal memory medium 601, the processor 602, and the communication interface 603 implement mutual communication connections through the bus 604.

The internal memory medium 601 may be a combination of at least two of a read-only memory, a static storage device, a dynamic storage device, a RAM, or an SCM. For example, the internal memory medium includes a DRAM and an SCM. The internal memory medium 601 may store computer instructions. When the computer instructions stored in the internal memory medium 601 are executed by the processor 602, the processor 602 and the communication interface 603 are configured to perform a method for controlling an internal memory bandwidth in a software system. The internal memory medium may further store a data set. For example, some storage resources in the internal memory medium 601 are divided into an area, used to store a page table and a program for implementing a function for controlling an internal memory bandwidth in embodiments of this disclosure.

A type of the internal memory medium 605 is similar to a type of the internal memory medium 601, or may be any one of the foregoing various internal memory medium types. However, in the computer 600, the type of the internal memory medium 605 is different from the type of the internal memory medium 601.

The processor 602 may be a general-purpose CPU, an ASIC, a GPU, or any combination thereof. The processor 602 may include one or more chips. The processor 602 may include an AI accelerator, for example, an NPU.

The communication interface 603 uses a transceiver module, for example, but not limited to a transceiver, to implement communication between the computer 600 and another device or a communication network. For example, an internal memory allocation request may be obtained through the communication interface 603.

The bus 604 may include a path for transmitting information between components (for example, the internal memory medium 601, the internal memory medium 605, the processor 602, and the communication interface 603) of the computer 600.

A communication path is established between the computers 600 by using the communication network. Any one or more of a request module 420, a bandwidth sensing module 430, a determining module 440, an adjustment module 450, and an access module 460 are run on each computer 600.

Any computer 600 may be a computer (for example, a server) in a cloud data center, a computer in an edge data center, or a terminal computing device.

Functions such as a database, big data, and a cloud service may be deployed on each computer 600. For example, the GPU is configured to implement a function of training a neural network.

The method steps in embodiments may be implemented in a hardware manner, or may be implemented by executing software instructions by a processor. The software instructions may include a corresponding software module. The software module may be stored in a RAM, a flash memory, a ROM, a PROM, an EPROM, an EEPROM, a register, a hard disk, a removable hard disk, a compact disc read-only memory (CD-ROM), or any other form of storage medium well-known in the art. For example, a storage medium is coupled to the processor, so that the processor can read information from the storage medium and write information into the storage medium. Certainly, the storage medium may alternatively be a component of the processor. The processor and the storage medium may be located in an ASIC. In addition, the ASIC may be located in a terminal device. Certainly, the processor and the storage medium may alternatively exist as discrete components in a network device or a terminal device.

All or some of the foregoing embodiments may be implemented by software, hardware, firmware, or any combination thereof. When software is used for implementation, all or some of embodiments may be implemented in a form of a computer program product. The computer program product includes one or more computer programs or instructions. When the computer programs or instructions are loaded and executed on a computer, all or some of the procedures or functions in embodiments of this disclosure are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium that can be accessed by the computer, or a data storage device, for example, a server or a data center, integrating one or more usable media. The usable medium may be a magnetic medium, for example, a floppy disk, a hard disk, or a magnetic tape, may be an optical medium, for example, a Digital Video Disc (DVD), or may be a semiconductor medium, for example, an SSD. The foregoing descriptions are merely specific implementations of this disclosure, but are not intended to limit the protection scope of this disclosure. Any modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:
1. A method, comprising:
obtaining a bandwidth requirement of a to-be-accessed internal memory medium, wherein the bandwidth requirement is a bandwidth required by a first processor to access the to-be-accessed internal memory medium;

obtaining an occupancy rate of an internal memory bandwidth of the to-be-accessed internal memory medium;

determining, based on the occupancy rate, that the to-be-accessed internal memory medium does not satisfy the bandwidth requirement;

adjusting, according to a bandwidth adjustment policy, the occupancy rate to obtain an adjusted remaining bandwidth, wherein the bandwidth adjustment policy indicates to adjust, based on a factor that affects the occupancy rate, the internal memory bandwidth; and using a first bandwidth that satisfies the bandwidth requirement and that is in the adjusted remaining bandwidth.

2. The method of claim 1, wherein the factor comprises at least one of a user-oriented application or a system-oriented application that is run by the first processor.

3. The method of claim 2, wherein adjusting the occupancy rate comprises controlling the factor to occupy the internal memory bandwidth to obtain the adjusted remaining bandwidth, and wherein the adjusted remaining bandwidth is greater than a remaining bandwidth before adjustment.

4. The method of claim 3, wherein controlling the factor comprises:

determining, based on the remaining bandwidth and a bandwidth threshold, a limited available bandwidth of the to-be-accessed internal memory medium; and controlling, based on the limited available bandwidth, the factor to access the to-be-accessed internal memory medium to obtain the adjusted remaining bandwidth.

5. The method of claim 4, further comprising obtaining, based on a total bandwidth of the to-be-accessed internal memory medium and an adjustment factor, the bandwidth threshold.

6. The method of claim 1, wherein using the first bandwidth comprises accessing, based on the first bandwidth, an internal memory space allocated at a preset internal memory allocation granularity in the to-be-accessed internal memory medium, and wherein the preset internal memory allocation granularity is greater than a page size of the internal memory medium.

7. An apparatus, comprising:

a hybrid internal memory system comprising a plurality of different types of internal memory media; and one or more processors coupled to the hybrid internal memory system and configured to:

obtain a bandwidth requirement of a to-be-accessed internal memory medium, wherein the bandwidth requirement is a bandwidth required to access the to-be-accessed internal memory medium, and wherein the to-be-access internal memory medium is one of the internal memory media;

obtain an occupancy rate of an internal memory bandwidth of the to-be-accessed internal memory medium;

determine, based on the occupancy rate, that the to-be-accessed internal memory medium does not satisfy the bandwidth requirement;

adjust, according to a bandwidth adjustment policy, the occupancy rate to obtain an adjusted remaining bandwidth, wherein the bandwidth adjustment policy indicates to adjust, based on a factor that affects the occupancy rate, the to-be-accessed internal memory medium; and use a first bandwidth that satisfies the bandwidth requirement and is in the adjusted remaining bandwidth.

8. The apparatus of claim 7, wherein the factor comprises at least one of a user-oriented application or a system-oriented application.

9. The apparatus of claim 8, wherein the one or more processors are further configured to control the factor to occupy the internal memory bandwidth to obtain the adjusted remaining bandwidth, and wherein the adjusted remaining bandwidth is greater than a remaining bandwidth before adjustment.

10. The apparatus of claim 9, wherein the one or more processors are further configured to:

determine, based on the remaining bandwidth and a bandwidth threshold, a limited available bandwidth of the to-be-accessed internal memory medium; and control, based on the limited available bandwidth, the factor to access the to-be-accessed internal memory medium to obtain the adjusted remaining bandwidth.

11. The apparatus of claim 10, wherein the one or more processors are further configured to obtain, based on a total bandwidth of the to-be-accessed internal memory medium and an adjustment factor, the bandwidth threshold.

12. The apparatus of claim 7, wherein the one or more processors are further configured to access, based on the first bandwidth, an internal memory space allocated at a preset internal memory allocation granularity in the to-be-accessed internal memory medium, and wherein the preset internal memory allocation granularity is greater than a page size of the internal memory medium.

13. The apparatus of claim 7, wherein the plurality of different types of internal memory media comprises a first internal memory medium and a second internal memory medium, wherein a first access speed of the first internal memory medium is greater than a second access speed of the second internal memory medium, and wherein the to-be-accessed internal memory medium is the first internal memory medium or the second internal memory medium.

14. The apparatus of claim 13, wherein the first internal memory medium is a dynamic random-access memory (DRAM), wherein the second internal memory medium is a storage-class memory (SCM), and wherein the SCM comprises at least one of a phase-change memory (PCM), a magnetoresistive random-access memory (MRAM), a resistive random-access memory (RRAM), a ferroelectric random-access memory (FRAM), a fast NAND, or a nano random-access memory (NRAM).

15. A computer program product comprising instructions stored on a non-transitory computer-readable medium that, when execute by one or more processors, cause an apparatus to:

obtain a bandwidth requirement of a to-be-accessed internal memory medium, wherein the bandwidth requirement is a bandwidth required by a first processor to access the to-be-accessed internal memory medium;

obtain an occupancy rate of an internal memory bandwidth of the to-be-accessed internal memory medium;

determine, based on the occupancy rate, that the to-be-accessed internal memory medium does not satisfy the bandwidth requirement;

adjust, according to a bandwidth adjustment policy, the occupancy rate to obtain an adjusted remaining bandwidth, wherein the bandwidth adjustment policy indicates to adjust, based on a factor that affects the occupancy rate, the internal memory bandwidth; and use a first bandwidth that satisfies the bandwidth requirement and is in the adjusted remaining bandwidth.

16. The computer program product of claim 15, wherein the factor comprises at least one of a user-oriented application or a system-oriented application that is run by the first processor.

17. The computer program product of claim 16, wherein the one or more processors are further configured to execute the instructions to control the factor to occupy the internal memory bandwidth to obtain the adjusted remaining bandwidth, and wherein the adjusted remaining bandwidth is greater than a remaining bandwidth before adjustment.

18. The computer program product of claim 17, wherein the one or more processors are further configured to execute the instructions to:
   determine, based on the remaining bandwidth and a bandwidth threshold, a limited available bandwidth of the to-be-accessed internal memory medium; and
   control, based on the limited available bandwidth, the factor to access the to-be-accessed internal memory medium to obtain the adjusted remaining bandwidth.

19. The computer program product of claim 18, wherein the one or more processors are further configured to obtain, based on a total bandwidth of the to-be-accessed internal memory medium and an adjustment factor, the bandwidth threshold.

20. The computer program product of claim 15, wherein the one or more processors are further configured to access, based on the first bandwidth, an internal memory space allocated at a preset internal memory allocation granularity in the to-be-accessed internal memory medium, and wherein the preset internal memory allocation granularity is greater than a page size of the internal memory medium.

\* \* \* \* \*